ELECTRICAL CODE TRANSLATORS
Filed July 11, 1958
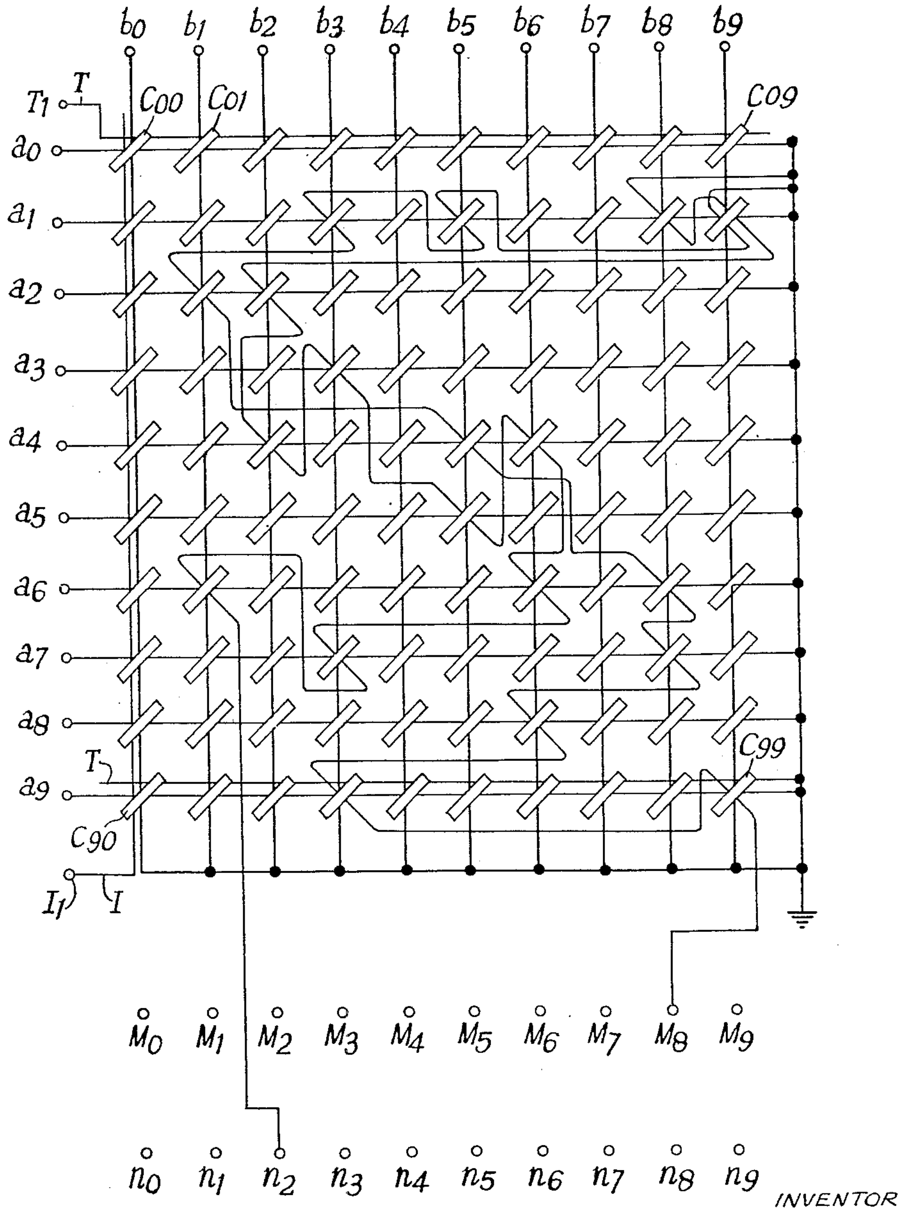
INVENTOR
ARYE LEIB FREEDMAN
BY
Paul M. Craig, Jr.
ATTORNEY United States Patent Office 2,997,705

Patented Aug. 22, 1961

2,997,705

ELECTRICAL CODE TRANSLATORS

Arye L. Freedman, Stevenage, England, assignor to Ericsson Telephones Limited, London, England, a British company Filed July 11, 1958, Ser. No. 747,889
Claims priority, application Great Britain July 24, 1957
7 Claims. (Cl. 340—347)

This invention relates to electrical code translators of the type adapted to provide output pulse signals in $n$ different combinations of a plurality of output circuits in response to the application of input signals to $n$ different combinations of input circuits.

Devices of the type specified may be used, for instance in automatic telephone apparatus.

The different combinations of output circuits may consist of the same or different numbers of circuits. In the latter case some, but not all, combinations of output circuits may have only one therein. The invention is concerned only with devices for which the different combinations of input circuits consist of the same number of circuits.

An output pulse signal is constituted either by a single pulse provided in a single circuit or a plurality of pulses simultaneously provided in a plurality of circuits respectively.

Translators have in the past been made using networks of diodes. These have all suffered from the disadvantage, however, that each input circuit comprises a first input terminal and a second input terminal. Simultaneously with the application of a signal to one or more input circuits, this being applied in the form of a pulse or pulses to the first input terminal or terminals of this circuit or circuits, a signal has to be applied to the remaining input circuit or circuits, this being applied in the form of a pulse or pulses to the second input terminal or terminals of this circuit or circuits.

In recent years switchable magnetic cores have been used for such purposes as they are cheaper and have a much longer life than diodes.

In this specification the term switchable magnetic core means a member of ferro-magnetic material having a hysteresis loop of such shape that on the application and removal of a magnetic field of appropriate sense to change the state of magnetisation of the material from one to the other of the two stable states, hereinafter referred to respectively as the A state and the B state, existing in zero external field after saturation of the core in two opposite senses respectively, as the magnitude of the field of the appropriate sense is increased from zero to a first value the flux within the material changes by a relatively small amount, as the magnitude of the field is increased beyond the first value by a value small compared with the first value a relatively large flux change, accompanied by change of sign, occurs and as the mganitude of the field is thereafter decreased to zero only a relatively small flux change occurs.

Materials having hysteresis loops of the shape known as rectangular are suitable materials. A rectangular hysteresis loop may be said to be one for which the remanent magnetic flux in the A state and the B state is 80% or more of the flux at saturation. The above definition is not however limited to cores of such materials.

In most of the proposed devices using switchable magnetic cores each input circuit has two input terminals to which signals have to be applied in the same way as in the case of a diode device.

It is an object of this invention to provide an improved electrical code translator of the type specified employing magnetic cores and which does not suffer from the above mentioned disadvantage.

According to the present invention an electrical code translator of the type defined comprises $n$ switchable magnetic cores and $k$ sets of input circuits, $k$ being greater than 1, connected into an operating circuit, each input circuit comprising a plurality of series-connected forward windings associated with different cores respectively, each core having associated therewith $k$ of the forward windings, the translator further comprising a plurality of output circuits each of which comprises at least one output winding associated with a core and at least one of which comprises a plurality of series-connected output windings associated with different cores, and the arrangement being such that, in operation, output pulse signals are provided in $n$ different combinations of output circuits in response to the application of input signals from the operating circuit to $n$ different combinations of one input circuit from each of the $k$ sets by the operating circuit.

The properties of switchable magnetic cores as defined are such that any spurious output pulses generated on account of, for instance, inequalities between windings or inequalities between applied pulses, will be substantially smaller than, and hence readily differentiable from, output pulses provided when the state of a core is switched. The cores may conveniently be in annular form and a winding may then consist of a wire threading the annulus. Series-connected windings associated with different cores may consist of a wire threading the different cores.

A forward winding energised by the operating circuit changes or tends to change the magnetisation of the core with which it is associated in the sense of a change from the A state to the B state.

Particularly when $k$ is greater than 2 it may be advantageous to provide each core with an inhibit winding connected into the operating circuit and which when energised by the operating circuit changes or tends to change the magnetisation of the core with which it is associated in the sense of a change from the B state to the A state.

According to a further aspect of the invention, where each core has an associated inhibit winding, the $n$ inhibit windings are connected together in series to form an inhibit circuit, one end of which is connected to one end of each of the input circuits, all the forward windings being of the same number of turns, all the inhibit windings being of this said number of turns multiplied by $(k-1)/k$.

In operating translators according to the invention it is usually convenient to provide input signals in the form of short, coincident pulses and the following description of the operation of translators according to the invention is written in such terms. It will be appreciated however that current signals of longer duration may be employed and initiated at different times, in which case an output pulse signal is provided when the last of the $k$ input circuits of a combination of input circuits is energised.

In operation of a translator according to the invention, without inhibit windings, the input pulses applied to an input circuit have an amplitude slightly greater than $1/k$ of the amplitude of a pulse, which when applied to that circuit, changes the state of all the cores having associated input windings in that circuit from the A state to the B state. Thus when input pulses are applied simultaneously to a combination of $k$ input circuits, that one core having its $k$ input windings included in the $k$ input circuits respectively changes state.

In operation of a translator according to the invention, with inhibit windings, the input pulses applied to an input circuit have an amplitude great enough to change the state of all the cores having associated input windings in that circuit from the A state to the B state. Whatever combination of input circuits pulses are applied to, pulses are simultaneously applied to the inhibit windings, these inhibit pulses being of such amplitude as to cancel the effect of $(k-1)$ input windings associated with each core. When input pulses are applied to the combination of $k$ input circuits which include the $k$ input windings on a core that one core changes state, since although the effect of $(k-1)$ of its associated windings is cancelled, the effect of the $k$th winding is not cancelled, and this changes the state of the core.

In translators wherein the inhibit windings are connected in series to a common lead as described above, the current pulse passing through the inhibit windings is the sum of the $k$ current passing through $k$ input circuits and on account of the ratio of turns of inhibit windings to turns of input windings namely $(k-1)/k$, the effect of each inhibit winding cancels the effect of $(k-1)$ input windings.

Although in embodiments of the invention where inhibit windings are connected to a common lead, as described above, it is necessary to make all the input windings of the same number of turns it will be appreciated that in other embodiments it is permissible, though rarely advantageous, to have some input windings of different numbers of turns from others, in operation it then being necessary to vary the amplitude of the input pulses applied to different input circuits.

In operation of all translators according to the invention when a core changes state an output pulse is provided in the output circuit or circuits having an output winding or windings associated with that core. It will often be convenient to include rectifiers in the output circuits to pass only the pulses generated when cores change from the A state to the B state.

Between each operation of a translator it is necessary to reset the state of the core which has been switched from the A state to the B state back to the A state. This is conveniently accomplished by providing reset windings on the cores, though such windings are not essential as pulses of opposite sense to those applied to switch a core from the A state to the B state may be applied to the appropriate input circuits to reset the core to the A state.

The invention will now be described, by way of example, with reference to the accompanying drawing, which is a schematic diagram of one embodiment of the invention.

One hundred annular magnetic cores $c_{00}$ to $c_{99}$ are arranged in a square array of ten rows and ten columns, each row and column containing ten cores. Ten input terminals $a_0$ to $a_9$, for one set of ten input circuits, correspond to the ten rows respectively and a further ten input terminals $b_0$ to $b_9$, for a second set of input circuits, correspond to the ten columns respectively. A wire from each input terminal threads the ten cores in the corresponding row or column and is connected at its other end to earth. Thus each core is provided with two input windings, one connected to a row input terminal and one to a column input terminal, the core $c_{ij}$ having input windings connected to the terminals $a_i$ and $b_j$, where $a_i$ and $b_j$ represent a general row and column input terminal respectively.

In operation input pulses are applied to the input terminals by an operating circuit (not shown) all being positive rectangular pulses of amplitude less than that necessary to change the sense of magnetisation of a core, but greater than half that necessary to change the sense of magnetisation of a core.

The arrangement of windings is such that a positive pulse applied to any input terminal tends to set all cores on the wire connected to that terminal to the B state. Initially all the cores are in the A state. The core $c_{ij}$ may be set to the B state by applying an input to the terminal $a_i$ and the terminal $b_j$.

The reset wire T connected between a reset terminal $T_1$ and earth threads all the hundred cores and a positive pulse applied to the reset terminal sets all the cores to the A state. For clarity only portions of the wire T have been shown. Similarly, an inhibit wire or winding I is shown threading all of the cores of the first column and may be continued to thread all the hundred cores although for the sake of clarity only portions of the wire I extending from the inhibit terminal $I_1$ have been shown.

Each core is provided with two output windings. There are also provided one set of ten output circuit terminals $m_0$ to $m_9$ a general one of these being given the symbol $m_p$, and a further set of ten output circuit terminals numbered $n_0$ to $n_9$ respectively, a general one of these being given the symbol $n_q$. Each output terminal is connected through ten output windings in series to earth. All the output windings are so used and each pair of output windings on the same core are connected one to a terminal in the series $m_0 \ldots m_9$ and the other to a terminal in the series $n_0 \ldots n_9$. Thus, the translator may comprise $s$ sets of output circuits, $s$ being greater than one, each output circuit comprising a plurality of series-connected output windings associated with different cores, each core having associated therewith $s$ of the output windings, the input and output circuits being so interrelated at the various cores of the matrix of cores to provide output pulse signals in $n$ different combinations of output circuits consisting of one circuit from each of the $s$ sets in response to the application of input signals from the operating circuit to $n$ different combinations, respectively, of one circuit from each of said $k$ sets, the operation being further clarified in the following description. The interrelationship of the input and output windings at the respective cores will be apparent from the following description and particularly the table below showing input and translated arrays of numbers.

For clarity only the output windings connected to the terminals $m_8$ and $n_2$ have been shown. Thus the terminal $m_8$ is connected to earth through series connected output windings associated with the cores $c_{13}$, $c_{15}$, $c_{19}$, $c_{21}$, $c_{45}$, $c_{68}$, $c_{78}$, $c_{86}$, $c_{93}$, and $c_{99}$, and the terminal $n_2$ is connected to earth through series-connected output windings associated with the cores $c_{18}$, $c_{19}$, $c_{22}$, $c_{33}$, $c_{42}$, $c_{46}$, $c_{55}$, $c_{61}$, $c_{66}$, and $c_{73}$.

When any core changes state an output pulse appears at one of the output terminals $m_p$ and one of the output terminals $n_q$. The output windings are so arranged that when a core changes from the A state to the B state a positive going pulse appears at the two corresponding output terminals.

A two digit decimal number input $ij$ may thus be represented by applying input pulses to the terminals $a_i$ and $b_j$, the core $c_{ij}$ then changes state. For example the number 19 is represented by an input applied to the terminals $a_1$ and the terminal $b_9$, the core $c_{19}$ then changing state.

A two digit decimal number output $pq$ is then obtained at the out terminals $m_p$ and $n_q$. The output number $pq$ corresponding to the input number $ij$ depends on the arrangement of the connections of the output windings. For instance when the core $c_{19}$ changes state an output pulse appears at the terminals $m_8$ and $n_2$, representing the number 82. Thus the number 10 has been translated into the number 82.

As an example the following translation may be effected by the translator. A number in any position of the first array is translated into the number in the corresponding position in the second array:

| | $b_0$ | $b_1$ | $b_2$ | $b_3$ | $b_4$ | $b_5$ | $b_6$ | $b_7$ | $b_8$ | $b_9$ |
|---|---|---|---|---|---|---|---|---|---|---|
| $a_0$ | 0 | 1 | 2 | 3 | 4 | 5 | 6 | 7 | 8 | 9 |
| $a_1$ | 10 | 11 | 12 | 13 | 14 | 15 | 16 | 17 | 18 | 19 |
| $a_2$ | 20 | 21 | 22 | 23 | 24 | 25 | 26 | 27 | 28 | 29 |
| $a_3$ | 30 | 31 | 32 | 33 | 34 | 35 | 36 | 37 | 38 | 39 |
| $a_4$ | 40 | 41 | 42 | 43 | 44 | 45 | 46 | 47 | 48 | 49 |
| $a_5$ | 50 | 51 | 52 | 53 | 54 | 55 | 56 | 57 | 58 | 59 |
| $a_6$ | 60 | 61 | 62 | 63 | 64 | 65 | 66 | 67 | 68 | 69 |
| $a_7$ | 70 | 71 | 72 | 73 | 74 | 75 | 76 | 77 | 78 | 79 |
| $a_8$ | 80 | 81 | 82 | 83 | 84 | 85 | 86 | 87 | 88 | 89 |
| $a_9$ | 90 | 91 | 92 | 93 | 94 | 95 | 96 | 97 | 98 | 99 |
| | 91 | 92 | 93 | 94 | 95 | 96 | 97 | 98 | 99 | 0 |
| | 32 | 19 | 49 | 40 | 41 | 10 | 62 | 54 | 4 | 82 |
| | 33 | 50 | 1 | 66 | 16 | 74 | 17 | 72 | 22 | 83 |
| | 59 | 28 | 57 | 5 | 34 | 77 | 48 | 23 | 61 | 84 |
| | 51 | 18 | 6 | 42 | 65 | 60 | 9 | 29 | 47 | 85 |
| | 31 | 59 | 27 | 55 | 15 | 8 | 24 | 71 | 35 | 86 |
| | 73 | 7 | 37 | 43 | 38 | 25 | 3 | 46 | 20 | 87 |
| | 75 | 39 | 56 | 2 | 52 | 14 | 26 | 36 | 70 | 88 |
| | 21 | 67 | 44 | 79 | 76 | 45 | 80 | 64 | 13 | 89 |
| | 81 | 53 | 11 | 30 | 63 | 68 | 78 | 69 | 12 | 90 |

In this example the output terminal $m_0$ would be connected to windings on cores $c_{09}$, $c_{13}$, $c_{22}$, $c_{33}$, $c_{42}$, $c_{46}$, $c_{55}$, $c_{61}$, $c_{66}$, and $c_{73}$ connected in series, the output terminal $m_1$ would be connected to windings on cores $c_{11}$, $c_{15}$, $c_{24}$, $c_{26}$, $c_{41}$, $c_{54}$, $c_{75}$, $c_{88}$, $c_{92}$, and $c_{98}$ connected in series, and so on, although these windings have not been shown.

In operation a pulse is applied to the reset terminal $T_1$ to ensure that all cores are in the A state. Two input pulses are then applied and output pulses taken from two output terminals. Thereafter a further pulse is applied to the reset terminal, resetting the core changed to the B state by the input pulses to the A state. It will frequently be advantageous to include rectifiers in the leads taken from the output terminals to pass only the output pulses derived when a core changes from the A state to the B state.

A reset winding is not essential and is not included in the invention in its broadest sense, though it will usually be the most convenient means for resetting cores to the B state. It is of course possible to reset cores by applying negative pulses to the input terminals.

Whilst an embodiment has been described wherein a number in one code is translated into a different number in the same code the invention is not limited to such translators. For example the translator described above could be provided with six output terminals instead of two sets of ten and be used to translate the decimal numbers 0 to 99 into binary code, either as the same numbers or as different numbers. The cores $c_{ij}$ would then have varying numbers of output windings. For instance the core $c_{00}$ would have no output windings, the cores $c_{01}$ and $c_{02}$ would have one output winding, the core $c_{03}$ would have two output windings and so on in the case where the decimal numbers are translated into the same numbers in the binary code.

Furthermore, for simplicity an embodiment has been described wherein all the input windings are of one turn in the same sense and input pulses of equal amplitude and the same sense are applied to all input terminals. In practice it will usually be convenient to arrange matters so, but it is not necessary to do so.

What is claimed is:

1. An electrical code translator comprising $n$ switchable magnetic cores, $k$ sets of input circuits, $k$ being greater than 1, each set including a plurality of input circuits, and an operating circuit, each input circuit being connected into said operating circuit and comprising a plurality of series-connected forward windings associated with different cores, each core having associated therewith $k$ of said forward windings, said translator further comprising $s$ sets of output circuits, $s$ being greater than one, each of said last-mentioned sets including a plurality of output circuits, each output circuit comprising a plurality of series-connected output windings associated with different cores, each core having associated therewith $s$ of said output windings, each input and each output circuit including connecting means for the respective forward and output windings, said connecting means operatively interrelating said windings with said cores to provide output pulse signals in $n$ different combinations of output circuits, each combination consisting of one output circuit from each of $s$ sets of output circuits, in response to the application of input signals from said operating circuit to $n$ different combinations respectively of one input circuit from each of said $k$ sets by the operating circuit.

2. An electrical code translator comprising $n$ switchable magnetic cores, $k$ sets of input circuits, $k$ being greater than 1, each set including a plurality of input circuits, each input circuit including means for connecting it to an operating circuit and comprising a plurality of series-connected input windings associated with different cores, each core having associated therewith $k$ of said input windings, said translator further comprising a plurality of output circuits each of which comprises at least one output winding associated with a core and at least some of which output circuits comprise a plurality of series-connected output windings associated with different cores, each input and each output circuit including connecting means for the respective input windings and output windings with said connecting means operatively interrelating said windings with said cores to provide output pulse signals in $n$ different combinations of output circuits in response to the application of input signals from an operating circuit to $n$ different combinations, respectively, of one input circuit from each of said $k$ sets, at least some of said different combinations of output circuits including a plurality of output circuits, at least some of said cores having a plurality of output windings connected in different respective output circuits.

3. A device according to claim 1, comprising a plurality of inhibit windings connected into said operating circuit and associated with said cores respectively, all said inhibit windings being energised by said operating circuit for the duration of each input signal applied from said operating circuit.

4. A device according to claim 3, wherein said inhibit windings are connected together in series to form an inhibit circuit, one end of which is connected to one end of each of said input circuits, all said forward windings being of the same number of turns, all said inhibit windings being of this said number of turns multiplied by $(k-1)/k$.

5. A device according to claim 1, wherein said switchable magnetic cores are annular in form.

6. A device according to claim 3, wherein said switchable magnetic cores are annular in form and all said forward windings and inhibit windings are of 1 turn constituted by a wire threading the core with which the winding is associated.

7. A device according to claim 1, wherein each core has A and B stable states of magnetization, each core having associated therewith a reset winding connected into said operating circuit, said input windings tending to set their respective cores to the B state, said operating circuit energising said reset windings to reset to the A state the magnetisation of any core in the B state.

References Cited in the file of this patent

UNITED STATES PATENTS 2,809,367 Stuart-Williams ---------- Oct. 8, 1957

FOREIGN PATENTS 769,384 Great Britain ------------ Mar. 6, 1957